United States Patent
Su et al.

(10) Patent No.: US 12,531,190 B2
(45) Date of Patent: Jan. 20, 2026

(54) MOVABLE DEVICE AND WOUND CAPACITOR PACKAGE STRUCTURE THEREOF

(71) Applicant: APAQ TECHNOLOGY CO., LTD., Miaoli County (TW)

(72) Inventors: Chung-Jui Su, Kaohsiung (TW); Ming-Tsung Liang, New Taipei (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 84 days.

(21) Appl. No.: 18/444,743

(22) Filed: Feb. 18, 2024

(65) Prior Publication Data

US 2025/0037941 A1 Jan. 30, 2025

(30) Foreign Application Priority Data

Jul. 25, 2023 (TW) .................................. 11212765.5

(51) Int. Cl.
| | |
|---|---|
| H01G 9/15 | (2006.01) |
| H01G 9/012 | (2006.01) |
| H01G 9/048 | (2006.01) |
| H01G 9/08 | (2006.01) |

(52) U.S. Cl.
CPC .............. *H01G 9/151* (2013.01); *H01G 9/012* (2013.01); *H01G 9/048* (2013.01); *H01G 9/08* (2013.01)

(58) Field of Classification Search
CPC ........ H01G 9/151; H01G 9/012; H01G 9/048; H01G 9/08
See application file for complete search history.

(56) References Cited

U.S. PATENT DOCUMENTS

| | | | | |
|---|---|---|---|---|
| 12,354,810 | B2 * | 7/2025 | Lin ........................ | H01G 9/012 |
| 2004/0100756 | A1 * | 5/2004 | Koizumi ................ | H01G 9/151 |
| | | | | 361/509 |
| 2008/0117567 | A1 * | 5/2008 | Nakamura ............. | H01G 9/008 |
| | | | | 361/537 |
| 2018/0269001 | A1 * | 9/2018 | Chen ...................... | H01G 9/055 |
| 2020/0402713 | A1 * | 12/2020 | Ishimaru ................. | H01G 2/02 |

(Continued)

FOREIGN PATENT DOCUMENTS

| | | | | |
|---|---|---|---|---|
| CN | 2884478 | Y | * 3/2007 | |
| CN | 115191019 | A | * 10/2022 | ............... H01G 9/15 |
| CN | 111902780 | B | * 8/2024 | ............... H01G 9/08 |

(Continued)

*Primary Examiner* — Timothy J. Dole
(74) *Attorney, Agent, or Firm* — Li & Cai Intellectual Property Office

(57) ABSTRACT

A movable device and a wound capacitor package structure thereof are provided. A first gap defined between a first exposed portion of a first conductive pin and an inner surface of a first bottom guide channel of the bottom seat plate ranges from 0.01 mm to 0.2 mm, and a first exposed height defined from a bottom side of the first exposed portion to the bottom side of the bottom seat plate ranges from 0.01 mm to 0.3 mm. A second gap defined between a second exposed portion of a second conductive pin and an inner surface of a second bottom guide channel of the bottom seat plate ranges from 0.01 mm to 0.2 mm, and a second exposed height defined from the bottom side of the second exposed portion to the bottom side of the bottom seat plate ranges from 0.01 mm to 0.3 mm.

10 Claims, 11 Drawing Sheets

(56) References Cited

U.S. PATENT DOCUMENTS

2022/0157521 A1* 5/2022 Nagara ................. H01G 2/106
2025/0069819 A1* 2/2025 Matsuki ................ H01G 9/048

FOREIGN PATENT DOCUMENTS

| CN | 118575246 A | * | 8/2024 | |
|---|---|---|---|---|
| JP | H09162078 A | * | 6/1997 | |
| JP | 2020123711 A | * | 8/2020 | ............... H01G 9/10 |
| WO | WO-2024062720 A1 | * | 3/2024 | ............. H01G 9/145 |

* cited by examiner

MOVABLE DEVICE AND WOUND CAPACITOR PACKAGE STRUCTURE THEREOF

CROSS-REFERENCE TO RELATED PATENT APPLICATION

This application claims the benefit of priority to Taiwan Patent Application No. 112127655, filed on Jul. 25, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor package structure, and more particularly to a wound capacitor package structure and a movable device using the wound capacitor package structure.

BACKGROUND OF THE DISCLOSURE

In the related art, applications of capacitors include being widely used in home appliances, computer motherboards and peripherals, power supplies, communication products and automobiles. Solid electrolytic capacitors are mainly used to provide functions such as filtering, bypassing, rectifying, coupling, blocking and transforming, and such capacitors have become an indispensable component in electronic products. However, there is still room for improvement in the related art of the wound capacitor.

SUMMARY OF THE DISCLOSURE

In response to the above-referenced technical inadequacy, the present disclosure provides a movable device and a wound capacitor package structure thereof for firmly fixing or bonding a first conductive pin and a second conductive pin on a circuit substrate through a first conductive material and a second conductive material that have configured to respectively disposed around (surround) the first conductive pin and the second conductive pin.

In order to solve the above-mentioned problems, one of the technical aspects adopted by the present disclosure is to provide a wound capacitor package structure, which includes a wound assembly, a conductive assembly, a package assembly and a bottom seat plate. The wound assembly includes a positive wound conductive foil, a negative wound conductive foil and two wound insulators. The conductive assembly includes a first conductive pin electrically contacting the positive wound conductive foil and a second conductive pin electrically contacting the negative wound conductive foil. The package assembly is configured to enclose the wound assembly. The bottom seat plate is disposed on a bottom side of the package assembly for carrying the package assembly. One of the two wound insulators is disposed between the positive wound conductive foil and the negative wound conductive foil, and one of the positive wound conductive foil and the negative wound conductive foil is disposed between the two wound insulators. The first conductive pin includes a first embedded portion accommodated inside the package assembly and a first exposed portion exposed outside the package assembly, the second conductive pin includes a second embedded portion accommodated inside the package assembly and a second exposed portion exposed outside the package assembly, and both the first exposed portion of the first conductive pin and the second exposed portion of the second conductive pin pass through the bottom seat plate and are partially exposed from a bottom side of the bottom seat plate. The bottom seat plate has a first through opening and a first bottom guide channel communicated with the first through opening, and the first exposed portion of the first conductive pin passes through the first through opening and extends along the first bottom guide channel. The bottom seat plate has a second through opening and a second bottom guide channel communicated with the second through opening, and the second exposed portion of the second conductive pin passes through the second through opening and extends along the second bottom guide channel. A first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm. A second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm. When the wound capacitor package structure is electrically connected to a circuit substrate through the first conductive pin and the second conductive pin respectively contacting a first conductive material and a second conductive material, the first exposed portion of the first conductive pin is configured to guide a portion of the first conductive material into the first gap defined between the first exposed portion of the first conductive pin and the inner surface of the first bottom guide channel of the bottom seat plate through capillary action, and the second exposed portion of the second conductive pin is configured to guide a portion of the second conductive material into the second gap defined between the second exposed portion of the second conductive pin and the inner surface of the second bottom guide channel of the bottom seat plate through capillary action.

In order to solve the above-mentioned problems, another one of the technical aspects adopted by the present disclosure is to provide a wound capacitor package structure, which includes a wound assembly, a conductive assembly, a package assembly and a bottom seat plate. The conductive assembly includes a first conductive pin electrically contacting the wound assembly and a second conductive pin electrically contacting the wound assembly. The package assembly is configured to enclose the wound assembly. The bottom seat plate is disposed on a bottom side of the package assembly for carrying the package assembly. Both a first exposed portion of the first conductive pin and a second exposed portion of the second conductive pin pass through the bottom seat plate and are partially exposed from a bottom side of the bottom seat plate. The bottom seat plate has a first through opening and a first bottom guide channel communicated with the first through opening, and the first exposed portion of the first conductive pin passes through the first through opening and extends along the first bottom guide channel. The bottom seat plate has a second through opening and a second bottom guide channel communicated with the second through opening, and the second exposed portion of the second conductive pin passes through the second through opening and extends along the second bottom guide channel. A first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm. A second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm.

In order to solve the above-mentioned problems, yet another one of the technical aspects adopted by the present disclosure is to provide a movable device configured to use a wound capacitor package structure, and the wound capacitor package structure includes a wound assembly, a conductive assembly, a package assembly and a bottom seat plate. The conductive assembly includes a first conductive pin electrically contacting the wound assembly and a second conductive pin electrically contacting the wound assembly, the package assembly is configured to enclose the wound assembly, and the bottom seat plate is disposed on a bottom side of the package assembly for carrying the package assembly. Both a first exposed portion of the first conductive pin and a second exposed portion of the second conductive pin pass through the bottom seat plate and are partially exposed from a bottom side of the bottom seat plate. The bottom seat plate has a first through opening and a first bottom guide channel communicated with the first through opening, and the first exposed portion of the first conductive pin passes through the first through opening and extends along the first bottom guide channel. The bottom seat plate has a second through opening and a second bottom guide channel communicated with the second through opening, and the second exposed portion of the second conductive pin passes through the second through opening and extends along the second bottom guide channel. A first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm. A second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm.

In one of the possible or preferred embodiments, the package assembly includes a package casing configured to accommodate the wound assembly and a bottom sealing structure disposed inside the package casing and cooperating with the package casing, and the wound assembly is completely enclosed by the package casing and the bottom sealing structure.

In one of the possible or preferred embodiments, the bottom seat plate has a plurality of first inner surfaces located in the first bottom guide channel, and the first inner surfaces include two first side inner surfaces corresponding to each other and a first top inner surface connected between the two first side inner surfaces. A first horizontal distance defined between the first exposed portion of the first conductive pin and one of the first side inner surfaces ranges from 0.01 mm to 0.2 mm, and a first vertical distance defined between the first exposed portion of the first conductive pin and the first top inner surface ranges from 0.01 mm to 0.2 mm. Before the wound capacitor package structure is electrically connected to the circuit substrate, a ratio of a first thickness of the first conductive material disposed on the circuit substrate to a first exposed height defined from the bottom side of the first exposed portion to the bottom side of the bottom seat plate is 0.1~0.2:0.01~0.3.

In one of the possible or preferred embodiments, the bottom seat plate has a plurality of second inner surfaces located in the second bottom guide channel, and the second inner surfaces include two second side inner surfaces corresponding to each other and a second top inner surface connected between the two second side inner surfaces. A second horizontal distance defined between the second exposed portion of the second conductive pin and one of the second side inner surfaces ranges from 0.01 mm to 0.2 mm, and a second vertical distance defined between the second exposed portion of the second conductive pin and the second top inner surface ranges from 0.01 mm to 0.2 mm. Before the wound capacitor package structure is electrically connected to the circuit substrate, a ratio of a second thickness of the second conductive material disposed on the circuit substrate to a second exposed height defined from the bottom side of the second exposed portion to the bottom side of the bottom seat plate is 0.1~0.2:0.01~0.3.

In one of the possible or preferred embodiments, the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

Therefore, in the a movable device and a wound capacitor package structure thereof provided by the present disclosure, by virtue of "a first gap that is defined between the first exposed portion of the first conductive pin and an inner surface of the first bottom guide channel of the bottom seat plate ranging from 0.01 mm to 0.2 mm," "a first exposed height that is defined from the bottom side of the first exposed portion to the bottom side of the bottom seat plate ranging from 0.01 mm to 0.3 mm," "a second gap that is defined between the second exposed portion of the second conductive pin and an inner surface of the second bottom guide channel of the bottom seat plate ranging from 0.01 mm to 0.2 mm" and "a second exposed height that is defined from the bottom side of the second exposed portion to the bottom side of the bottom seat plate ranging from 0.01 mm to 0.3 mm," the first conductive pin and the second conductive pin can be firmly fixed or bonded on the circuit substrate through the first conductive material and the second conductive material that have configured to respectively disposed around (surround) the first conductive pin and the second conductive pin, so that the shock resisting capacity or the anti-seismic effect of the wound capacitor package structure (for example, the wound capacitor package structure can be applied to any type of vehicle) can be improved, and the electrical connection between the wound capacitor package structure and the circuit substrate can be ensured (that is to say, there will be no circuit break).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
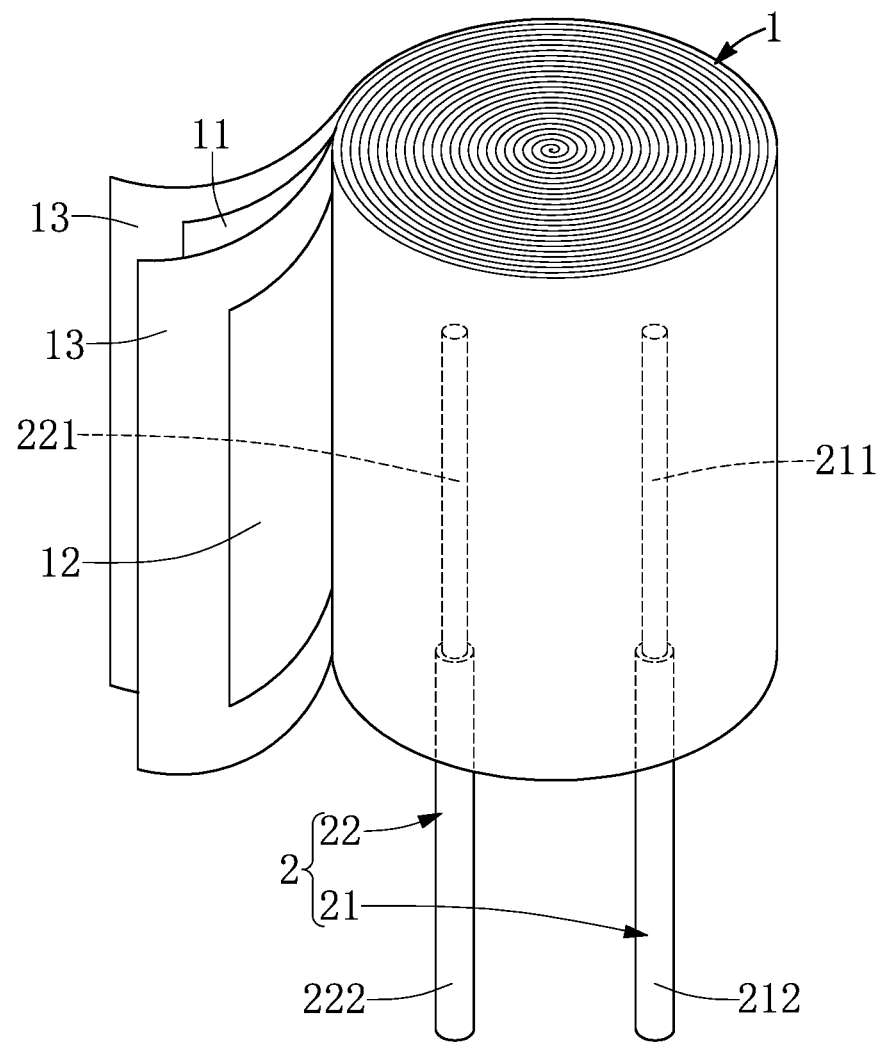
FIG. 1 is a schematic perspective view of a wound assembly and a conductive assembly cooperating with each other according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 10, a first embodiment of the present disclosure provides a wound capacitor package structure S (or a wound capacitor package structure), which includes a wound assembly 1, a conductive assembly 2, a package assembly 3 and a bottom seat plate 4 (or a bottom capacitor carrier).

Firstly, as shown in FIG. 1, the wound assembly 1 includes a positive wound conductive foil 11, a negative wound conductive foil 12 and two wound insulators 13 (or two wound separator papers). For example, one of the two wound insulators 13 can be disposed between the positive wound conductive foil 11 and the negative wound conductive foil 12, and one of the positive wound conductive foil 11 and the negative wound conductive foil 12 can be disposed between the two wound insulators 13 (for example, FIG. 1 shows a positive wound conductive foil 11 disposed between the two wound insulators 13). In addition, the wound insulator 13 can be a separator paper or a paper foil with conductive polymer by dipping. However, the aforementioned details are disclosed for exemplary purposes only, and are not meant to limit the scope of the present disclosure.

Figure 2:
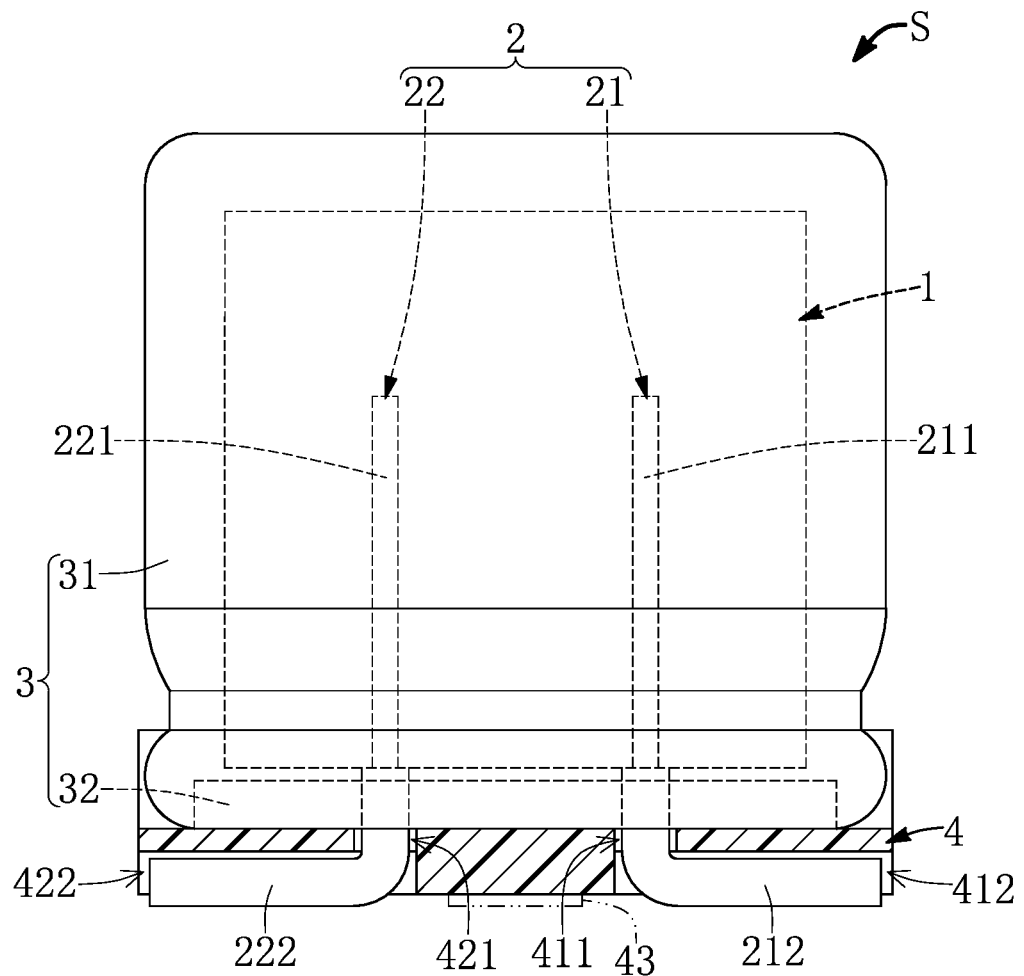
FIG. 2 is a schematic front view of the wound capacitor package structure provided by the first embodiment of the present disclosure.

Furthermore, referring to FIG. 1 and FIG. 2, the conductive assembly 2 including a first conductive pin 21 (or a first conductive lead) electrically contacting the positive wound conductive foil 11 and a second conductive pin 22 (or a second conductive lead) electrically contacting the negative wound conductive foil 12, the package assembly 3 is configured to enclose (or wrap) the wound assembly 1, and the bottom seat plate 4 is disposed on a bottom side of the package assembly 3 for carrying the package assembly 3. More particularly, the first conductive pin 21 includes a first embedded portion 211 accommodated inside the package assembly 3 and a first exposed portion 212 exposed outside (or from) the package assembly 3, and the second conductive pin 22 includes a second embedded portion 221 accommodated inside the package assembly 3 and a second exposed portion 222 exposed outside (or from) the package assembly 3. In addition, both the first exposed portion 212 of the first conductive pin 21 and the second exposed portion 222 of the second conductive pin 22 pass through the bottom seat plate 4 and are partially exposed from a bottom side of the bottom seat plate 4. For example, the package assembly 3 includes a package casing 31 (such as an aluminum casing or a casing made of any metal material) configured to accommodate the wound assembly 1 and a bottom sealing structure 32 (such as a sealing rubber or any sealing body made of insulative material) disposed inside the package casing 31 and cooperating with the package casing 31, and the wound assembly 1 can be completely enclosed or wrapped by cooperation of the package casing 31 and the bottom sealing structure 32. However, the aforementioned details are disclosed for exemplary purposes only, and are not meant to limit the scope of the present disclosure.

Figure 3:
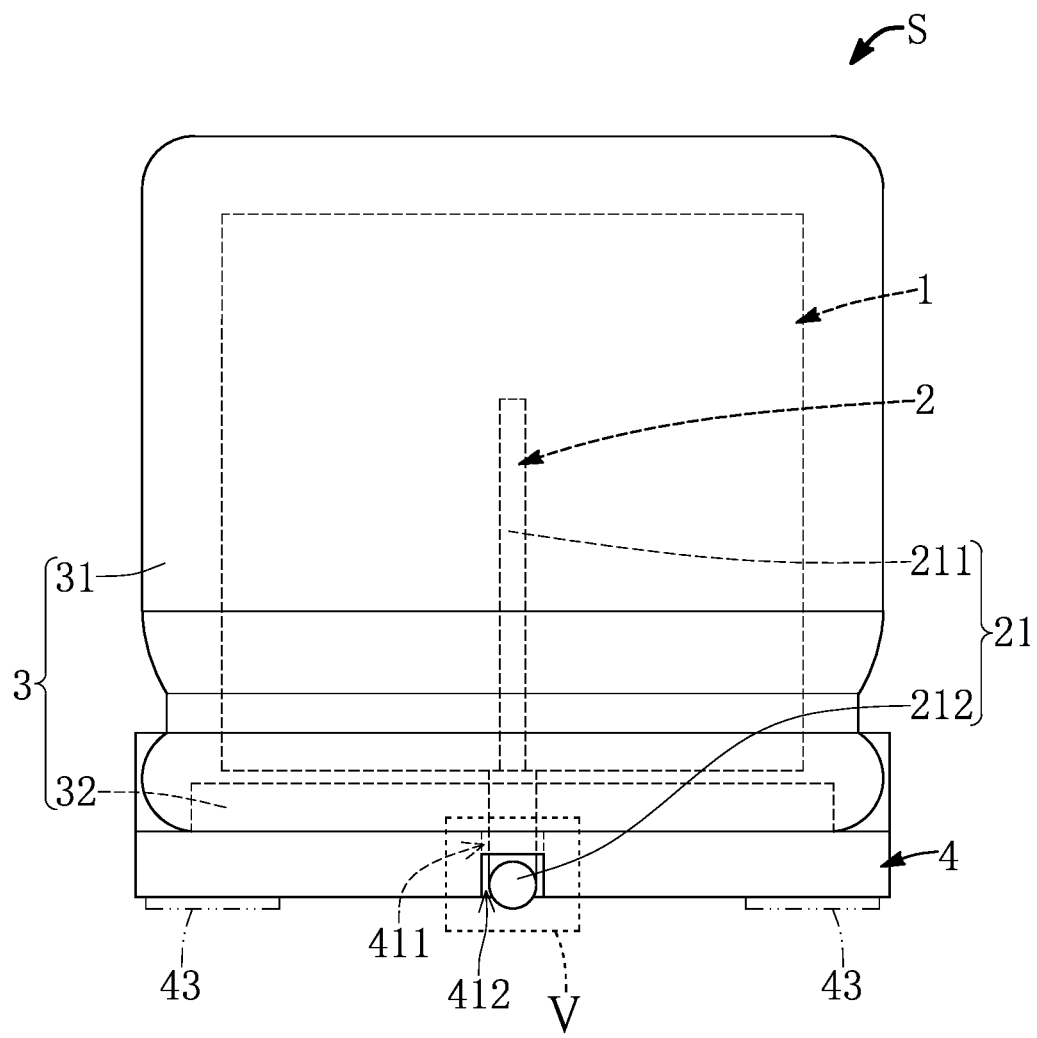
FIG. 3 is a schematic left side view of the wound capacitor package structure provided by the first embodiment of the present disclosure.
Figure 5:
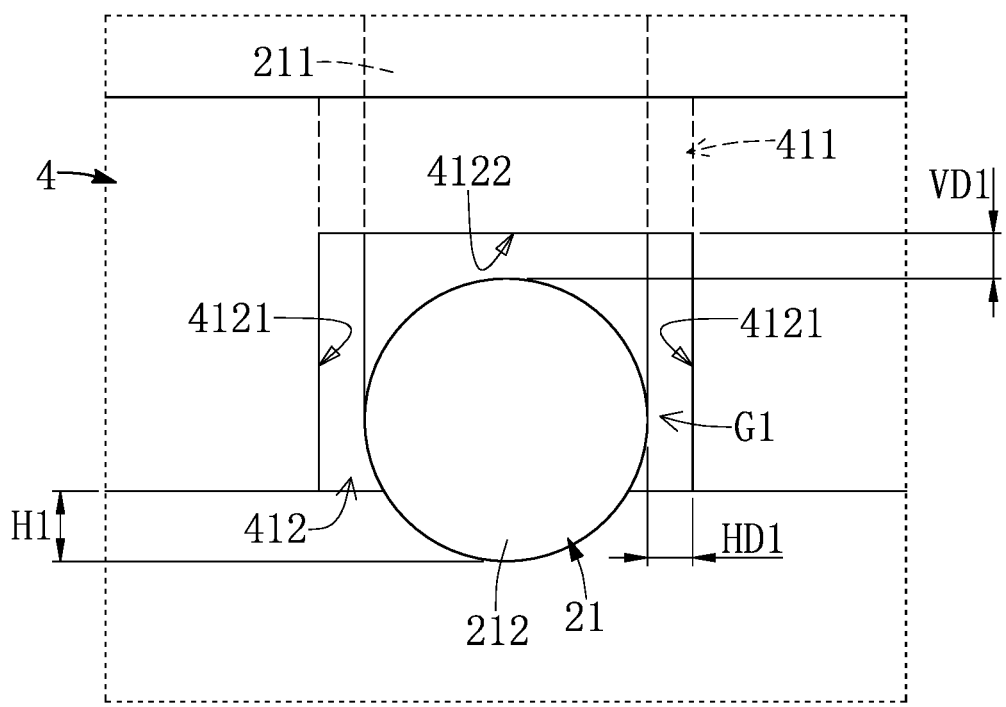
FIG. 5 is a schematic enlarged view of part V of FIG. 3.

More particularly, referring to FIG. 2, FIG. 3 and FIG. 5, the bottom seat plate 4 has a first through opening 411 and a first bottom guide channel 412 (or a first bottom guiding groove) communicated with the first through opening 411, and the first exposed portion 212 of the first conductive pin 21 can pass through the first through opening 411 and extend along the first bottom guide channel 412 (that is to say, after the first exposed portion 212 is bent relative to the first embedded portion 211, the first exposed portion 212 can be partially accommodated in the first bottom guide channel 412). It should be noted that a first gap G1 that is defined between the first exposed portion 212 of the first conductive pin 21 and an inner surface of the first bottom guide channel 412 of the bottom seat plate 4 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 and 0.20, the same range from 0.01 mm to 0.2 mm below also applies to the examples here), a bottom side of the first exposed portion 212 of the first conductive pin 21 is exposed from the first bottom guide channel 412 of the bottom seat plate 4, and a first exposed height H1 that is defined from the bottom side of the first exposed portion 212 to the bottom side of the bottom seat plate 4 can range from 0.01 mm to 0.3 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29 and 0.30, the same range from 0.01 mm to 0.3 mm below also applies to the examples here). For example, the bottom seat plate 4 has a plurality of first inner surfaces located in the first bottom guide channel 412, and the first inner surfaces include two first side inner surfaces 4121 corresponding to each other and a first top inner surface 4122 connected between the two first side inner surfaces 4121. In addition, a first horizontal distance HD1 that is defined between the first exposed portion 212 of the first conductive pin 21 and one of the first side inner surfaces 4121 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 and 0.20), and a first vertical distance VD1 that is defined between the first exposed portion 212 of the first conductive pin 21 and the first top inner surface 4122 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29 and 0.30). However, the aforementioned details are disclosed for exemplary purposes only, and are not meant to limit the scope of the present disclosure.

Figure 4:
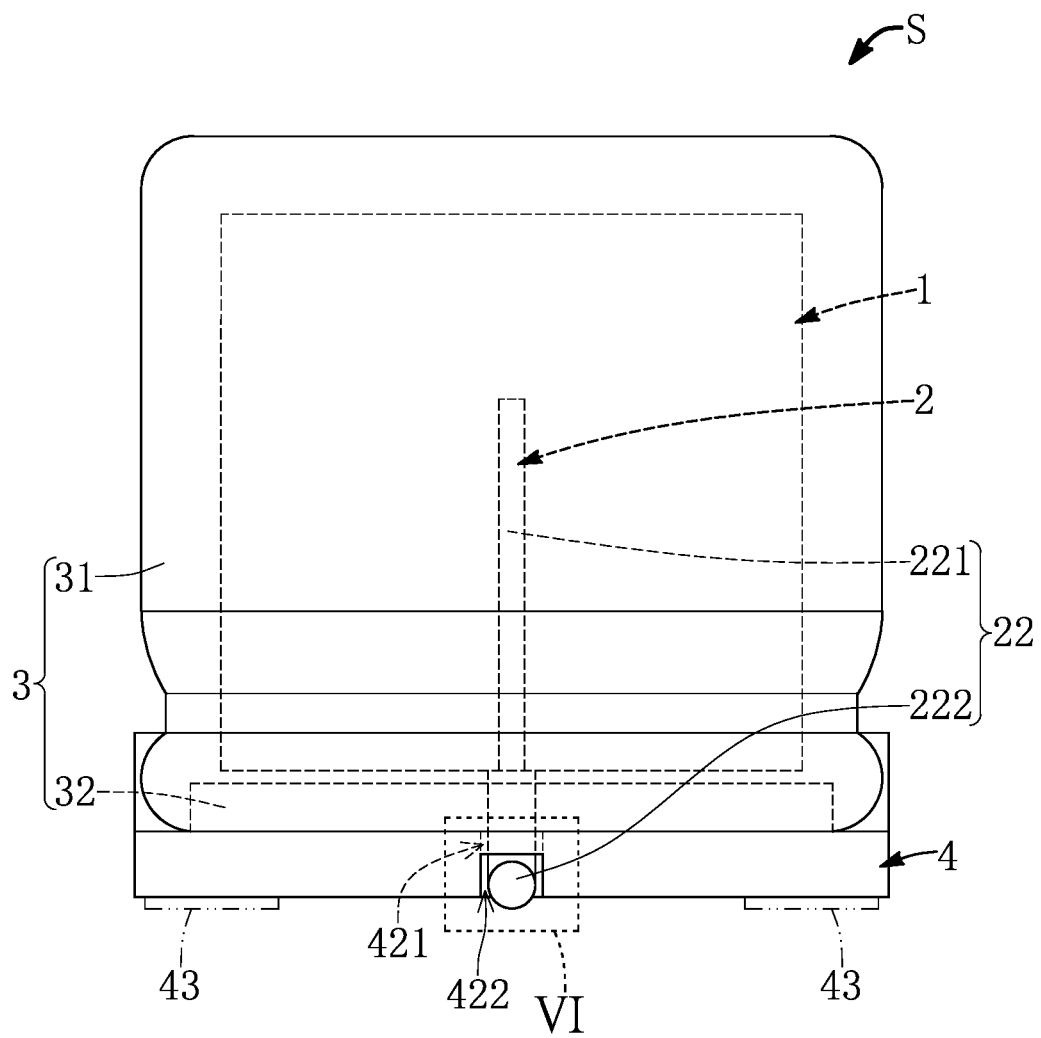
FIG. 4 is a schematic right side view of the wound capacitor package structure provided by the first embodiment of the present disclosure.
Figure 6:
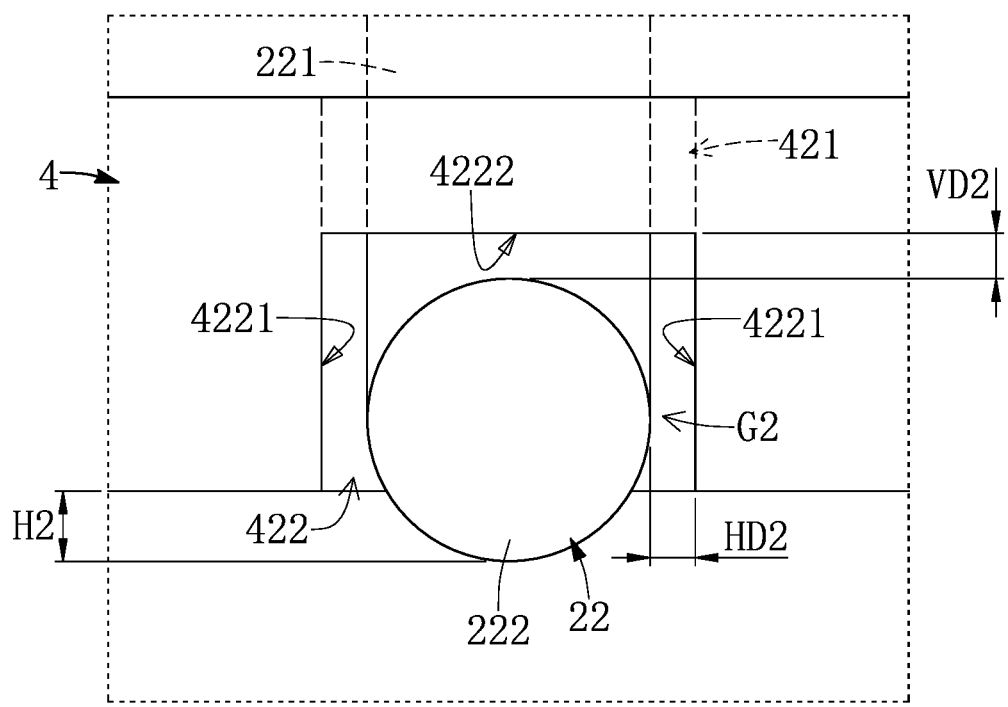
FIG. 6 is a schematic enlarged view of part V1 of FIG. 4.

More particularly, referring to FIG. 2, FIG. 4 and FIG. 6, the bottom seat plate 4 has a second through opening 421 and a second bottom guide channel 422 (or a second bottom guiding groove) communicated with the second through opening 421, and the second exposed portion 222 of the second conductive pin 22 can pass through the second through opening 421 and extend along the second bottom guide channel 422 (that is to say, after the second exposed portion 222 is bent relative to the second embedded portion 221, the second exposed portion 222 can be partially accommodated in the second bottom guide channel 422). It should be noted that a second gap G2 that is defined between the second exposed portion 222 of the second conductive pin 22 and an inner surface of the second bottom guide channel 422 of the bottom seat plate 4 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 and 0.20, the same range from 0.01 mm to 0.2 mm below also applies to the examples here), a bottom side of the second exposed portion 222 of the second conductive pin 22 is exposed from the second bottom guide channel 422 of the bottom seat plate 4, and a second exposed height H2 that is defined from the bottom side of the second exposed portion 222 to the bottom side of the bottom seat plate 4 can range from 0.01 mm to 0.3 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29 and 0.30, the same range from 0.01 mm to 0.3 mm below also applies to the examples here). For example, the bottom seat plate 4 has a plurality of second inner surfaces located in the second bottom guide channel 422, and the second inner surfaces include two second side inner surfaces 4221 corresponding to each other and a second top inner surface 4222 connected between the two second side inner surfaces 4221. In addition, a second horizontal distance HD2 that is defined between the second exposed portion 222 of the second conductive pin 22 and one of the second side inner surfaces 4221 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19 and 0.20), and a second vertical distance VD2 that is defined between the second exposed portion 222 of the second conductive pin 22 and the second top inner surface 4222 can range from 0.01 mm to 0.2 mm (such as any numeric value in mm among 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29 and 0.30). However, the aforementioned details are disclosed for exemplary purposes only, and are not meant to limit the scope of the present disclosure.

Figure 7:
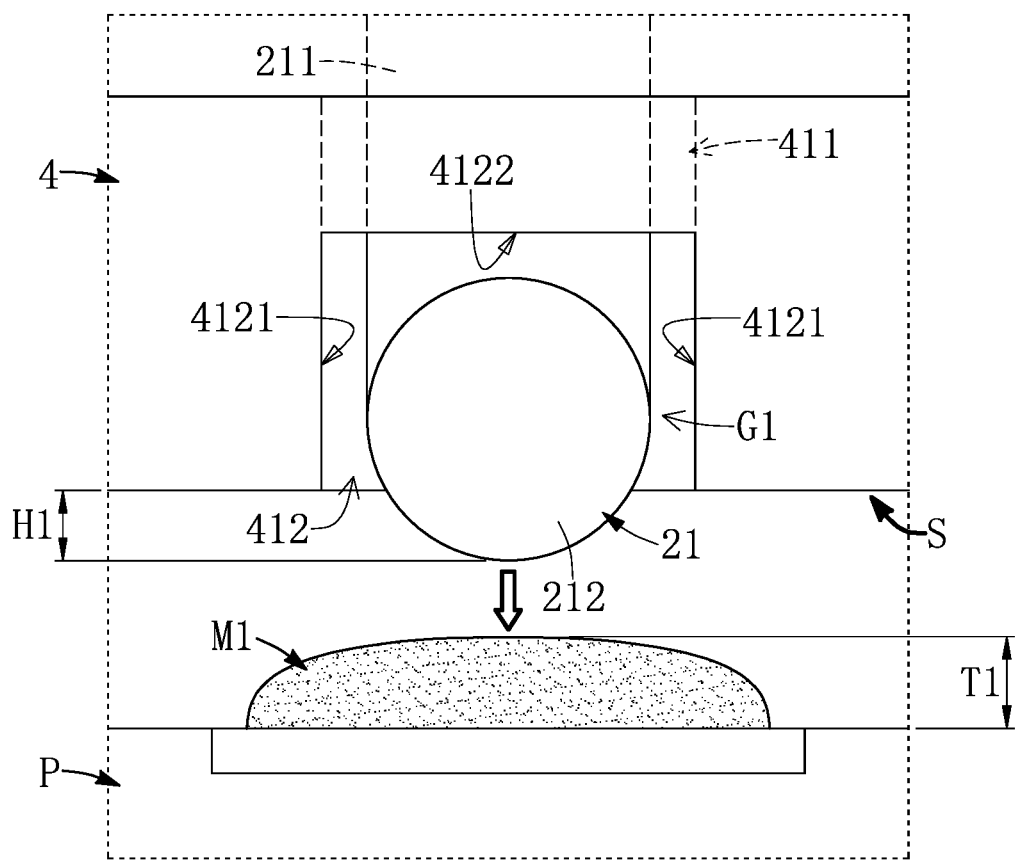
FIG. 7 is a schematic enlarged view of a first conductive pin of the wound capacitor package structure before contacting with a first conductive material according to the first embodiment of the present invention.
Figure 8:
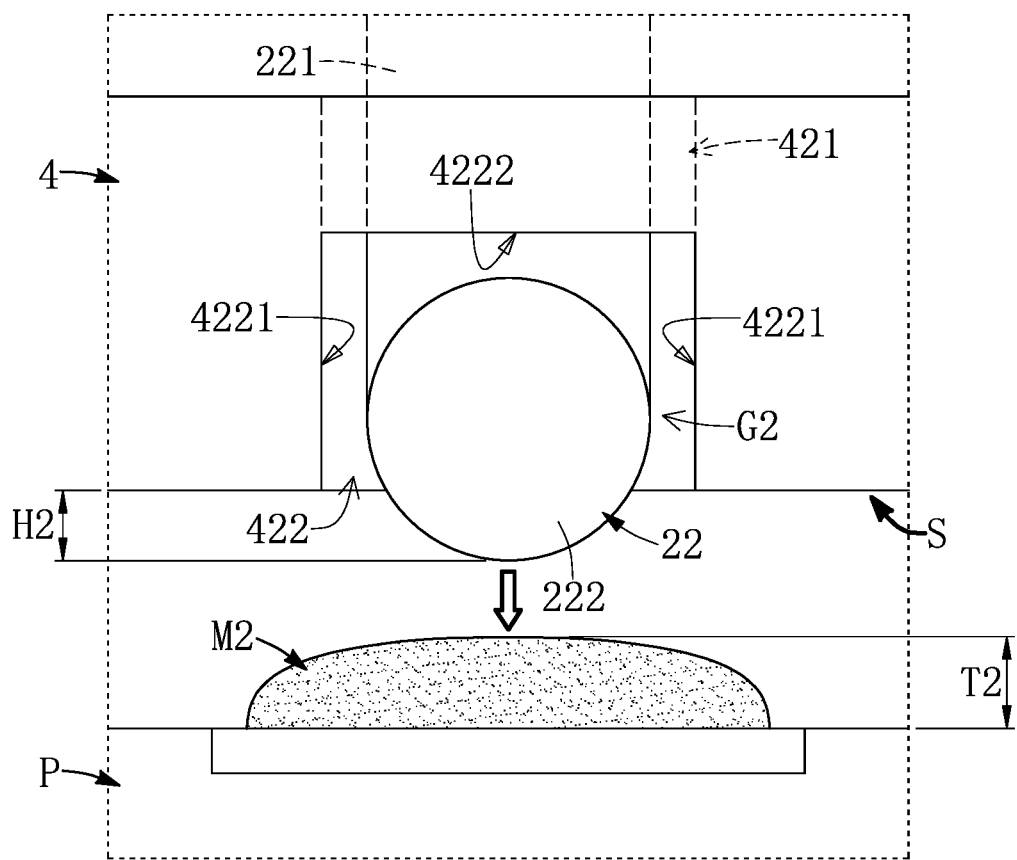
FIG. 8 is a schematic enlarged view of a second conductive pin of the wound capacitor package structure before contacting with a second conductive material according to the first embodiment of the present invention.

For example, as shown in FIG. 7, before the wound capacitor package structure S is electrically connected to the circuit substrate P, a ratio of "a first thickness T1 (e.g., 0.1~0.2 mm) of the first conductive material M1 (such as solder balls, solder paste or any conductive material) that is disposed on the circuit substrate P" to "a first exposed height H1 (e.g., 0.01~0.3 mm) that is defined from the bottom side of the first exposed portion 212 to the bottom side of the bottom seat plate 4" is substantially 0.1~0.2:0.01~0.3. In addition, as shown in FIG. 8, before the wound capacitor package structure S is electrically connected to the circuit substrate P, a ratio of "a second thickness T2 (e.g., 0.1~0.2 mm) of the second conductive material M2 (such as solder balls, solder paste or any conductive material) that is disposed on the circuit substrate P" to "a second exposed height H2 (e.g., 0.01~0.3 mm) that is defined from the bottom side of the second exposed portion 222 to the bottom side of the bottom seat plate 4" is substantially 0.1~0.2:0.01~0.3. However, the aforementioned details are disclosed for exemplary purposes only, and are not meant to limit the scope of the present disclosure.

Figure 9:
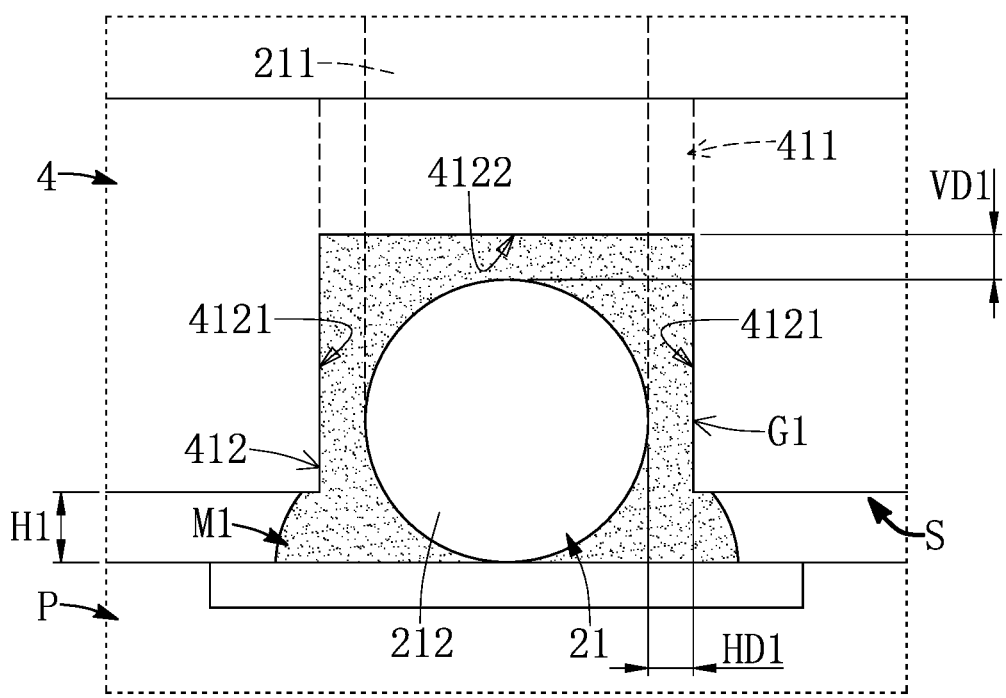
FIG. 9 is a schematic enlarged view of the first conductive pin of the wound capacitor package structure after contacting with the first conductive material according to the first embodiment of the present invention.
Figure 10:
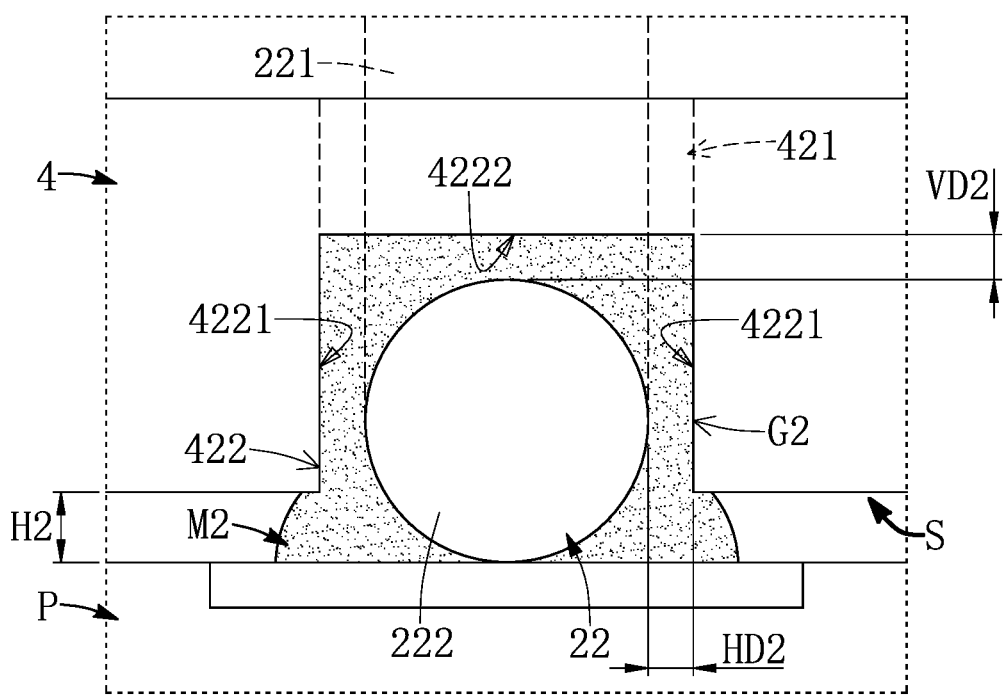
FIG. 10 is a schematic enlarged view of the second conductive pin of the wound capacitor package structure after contacting with the second conductive material according to the first embodiment of the present invention.
Figure 11:
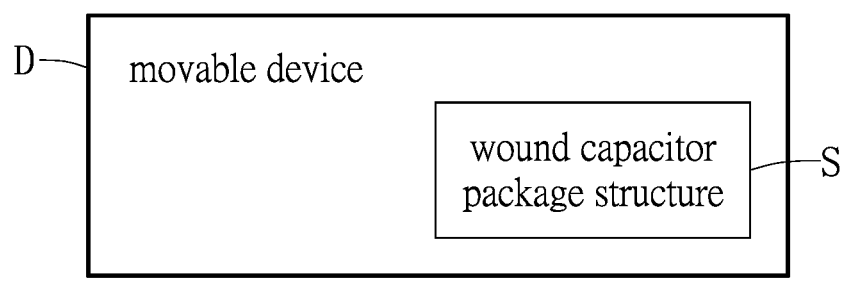
FIG. 11 is a functional block diagram of a movable device using a wound capacitor package structure according to a second embodiment of the present disclosure.

Therefore, referring to FIG. 7 and FIG. 9, when the wound capacitor package structure S is electrically connected to a circuit substrate P through the first conductive pin 21 and the second conductive pin 22 that respectively contact a first conductive material M1 and a second conductive material M2, the first exposed portion 212 of the first conductive pin 21 can be configured to guide a portion of the first conductive material M1 into the first gap G1 that is defined between the first exposed portion 212 of the first conductive pin 21 and the inner surface of the first bottom guide channel 412 of the bottom seat plate 4 through capillary action, according to the definition or setting of one of the four parameter conditions of the first exposed height H1, the first horizontal distance HD1, the first vertical distance VD1 and the ratio of the first thickness T1 to the first exposed height H1. In addition, referring to FIG. 8 and FIG. 10, when the wound capacitor package structure S is electrically connected to a circuit substrate P through the first conductive pin 21 and the second conductive pin 22 that respectively contact a first conductive material M1 and a second conductive material M2, the second exposed portion 222 of the second conductive pin 22 can be configured to guide a portion of the second conductive material M2 into the second gap G2 that is defined between the second exposed portion 222 of the second conductive pin 22 and the inner surface of the second bottom guide channel 422 of the bottom seat plate 4 through capillary action, according to the definition or setting of one of the four parameter conditions of the second exposed height H2, the second horizontal distance HD2, the second vertical distance VD2 and the ratio of the second thickness T2 to the second exposed height H2. Hence, the first conductive pin 21 and the second conductive pin 22 can be firmly fixed or bonded on the circuit substrate P through the first conductive material M1 and the second conductive material M2 that have configured to respectively disposed around (surround) the first conductive pin 21 and the second conductive pin 22 (that is to say, the first conductive material M1 and the second conductive material M2 can be formed through capillary action as shown in FIG. 9 and FIG. 10), so that the shock resisting capacity or the anti-seismic effect of the wound capacitor package structure S can be improved (for example, the wound capacitor package structure S can be applied to any type of vehicle), and the electrical connection between the wound capacitor package structure S and the circuit substrate P can be ensured (that is to say, there will be no circuit break).

It should be noted that, for example, referring to FIG. 2, FIG. 3 and FIG. 4, in one possible embodiment, the bottom seat plate 4 has at least two convex support portions 43 disposed on the bottom side thereof and corresponding to each other, the first bottom guide channel 412 and the second bottom guide channel 422 are located between the at least two convex support portions 43, and a height of each of the convex support portion 43 is substantially equal to the first exposed height H1 or the second exposed height H2, thereby improving the stability when the bottom seat plate 4 is disposed on the circuit substrate P. For example, in actual testing, when the test acceleration is 30G (1G=9.8 m/s$^2$), the failure rate of the wound capacitor package structure S provided by the first embodiment of the present disclosure after 12 hours can be 0%, and when the test acceleration is 35G, the failure rate of the wound capacitor package structure S provided by the first embodiment of the present disclosure after 6 hours can be 0%. However, the aforementioned details are disclosed for exemplary purposes only, and are not meant to limit the scope of the present disclosure.

Second Embodiment

Referring to FIG. 2 to FIG. 11, a second embodiment of the present disclosure provides a movable device D that can be any means of transportation (such as cars, boats, airplanes, etc.), and the movable device D can be configured to use a wound capacitor package structure S provided by the first embodiment of the present disclosure (that is to say, the wound capacitor package structure S can be applied to any transportation such as cars, boats, airplanes, etc.), in which the wound capacitor package structure S includes a wound assembly 1, a conductive assembly 2, a package assembly 3 and a bottom seat plate 4.

Beneficial Effects of the Embodiments

In conclusion, in the a movable device D and a wound capacitor package structure S thereof provided by the present disclosure, by virtue of "a first gap G1 that is defined between the first exposed portion 212 of the first conductive pin 21 and an inner surface of the first bottom guide channel 412 of the bottom seat plate 4 ranging from 0.01 mm to 0.2 mm," "a first exposed height H1 that is defined from the bottom side of the first exposed portion 212 to the bottom side of the bottom seat plate 4 ranging from 0.01 mm to 0.3 mm," "a second gap G2 that is defined between the second exposed portion 222 of the second conductive pin 22 and an inner surface of the second bottom guide channel 422 of the bottom seat plate 4 ranging from 0.01 mm to 0.2 mm" and "a second exposed height H2 that is defined from the bottom side of the second exposed portion 222 to the bottom side of the bottom seat plate 4 ranging from 0.01 mm to 0.3 mm," the first conductive pin 21 and the second conductive pin 22 can be firmly fixed or bonded on the circuit substrate P through the first conductive material M1 and the second conductive material M2 that have configured to respectively disposed around (surround) the first conductive pin 21 and the second conductive pin 22, so that the shock resisting capacity or the anti-seismic effect of the wound capacitor package structure S can be improved (for example, the wound capacitor package structure S can be applied to any type of vehicle), and the electrical connection between the wound capacitor package structure S and the circuit substrate P can be ensured (that is to say, there will be no circuit break).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wound capacitor package structure, comprising:
a wound assembly including a positive wound conductive foil, a negative wound conductive foil and two wound insulators;
a conductive assembly including a first conductive pin electrically contacting the positive wound conductive foil and a second conductive pin electrically contacting the negative wound conductive foil;
a package assembly configured to enclose the wound assembly; and
a bottom seat plate disposed on a bottom side of the package assembly for carrying the package assembly;
wherein, one of the two wound insulators is disposed between the positive wound conductive foil and the negative wound conductive foil, and one of the positive wound conductive foil and the negative wound conductive foil is disposed between the two wound insulators;
wherein the first conductive pin includes a first embedded portion accommodated inside the package assembly and a first exposed portion exposed outside the package assembly, the second conductive pin includes a second embedded portion accommodated inside the package assembly and a second exposed portion exposed outside the package assembly, and both the first exposed portion of the first conductive pin and the second exposed portion of the second conductive pin pass through the bottom seat plate and are partially exposed from a bottom side of the bottom seat plate;
wherein the bottom seat plate has a first through opening and a first bottom guide channel communicated with the first through opening, and the first exposed portion of the first conductive pin passes through the first through opening and extends along the first bottom guide channel;
wherein the bottom seat plate has a second through opening and a second bottom guide channel communicated with the second through opening, and the second exposed portion of the second conductive pin passes through the second through opening and extends along the second bottom guide channel;
wherein a first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm;
wherein a second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm;
wherein, when the wound capacitor package structure is electrically connected to a circuit substrate through the first conductive pin and the second conductive pin respectively contacting a first conductive material and a second conductive material, the first exposed portion of the first conductive pin is configured to guide a portion of the first conductive material into the first gap defined between the first exposed portion of the first conductive pin and the inner surface of the first bottom guide channel of the bottom seat plate through capillary action, and the second exposed portion of the second conductive pin is configured to guide a portion of the second conductive material into the second gap defined between the second exposed portion of the second conductive pin and the inner surface of the second bottom guide channel of the bottom seat plate through capillary action.

2. The wound capacitor package structure according to claim 1,
wherein the package assembly includes a package casing configured to accommodate the wound assembly and a bottom sealing structure disposed inside the package casing and cooperating with the package casing, and the wound assembly is completely enclosed by the package casing and the bottom sealing structure;
wherein the bottom seat plate has a plurality of first inner surfaces located in the first bottom guide channel, and the first inner surfaces include two first side inner surfaces corresponding to each other and a first top inner surface connected between the two first side inner surfaces;
wherein, a first horizontal distance defined between the first exposed portion of the first conductive pin and one of the first side inner surfaces ranges from 0.01 mm to 0.2 mm, and a first vertical distance defined between the first exposed portion of the first conductive pin and the first top inner surface ranges from 0.01 mm to 0.2 mm;
wherein, before the wound capacitor package structure is electrically connected to the circuit substrate, a ratio of a first thickness of the first conductive material disposed on the circuit substrate to a first exposed height defined from the bottom side of the first exposed portion to the bottom side of the bottom seat plate is 0.1~0.2:0.01~0.3;
wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

3. The wound capacitor package structure according to claim 1,
wherein the package assembly includes a package casing configured to accommodate the wound assembly and a bottom sealing structure disposed inside the package casing and cooperating with the package casing, and the wound assembly is completely enclosed by the package casing and the bottom sealing structure;
wherein the bottom seat plate has a plurality of second inner surfaces located in the second bottom guide channel, and the second inner surfaces include two second side inner surfaces corresponding to each other and a second top inner surface connected between the two second side inner surfaces;
wherein, a second horizontal distance defined between the second exposed portion of the second conductive pin and one of the second side inner surfaces ranges from 0.01 mm to 0.2 mm, and a second vertical distance defined between the second exposed portion of the second conductive pin and the second top inner surface ranges from 0.01 mm to 0.2 mm;

wherein, before the wound capacitor package structure is electrically connected to the circuit substrate, a ratio of a second thickness of the second conductive material disposed on the circuit substrate to a second exposed height defined from the bottom side of the second exposed portion to the bottom side of the bottom seat plate is 0.1~0.2:0.01~0.3;

wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

4. A wound capacitor package structure, comprising:
a wound assembly;
a conductive assembly including a first conductive pin electrically contacting the wound assembly and a second conductive pin electrically contacting the wound assembly;
a package assembly configured to enclose the wound assembly; and
a bottom seat plate disposed on a bottom side of the package assembly for carrying the package assembly;
wherein both a first exposed portion of the first conductive pin and a second exposed portion of the second conductive pin pass through the bottom seat plate and are partially exposed from a bottom side of the bottom seat plate;
wherein the bottom seat plate has a first through opening and a first bottom guide channel communicated with the first through opening, and the first exposed portion of the first conductive pin passes through the first through opening and extends along the first bottom guide channel;
wherein the bottom seat plate has a second through opening and a second bottom guide channel communicated with the second through opening, and the second exposed portion of the second conductive pin passes through the second through opening and extends along the second bottom guide channel;
wherein a first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm;
wherein a second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm.

5. The wound capacitor package structure according to claim 4,
wherein the package assembly includes a package casing configured to accommodate the wound assembly and a bottom sealing structure disposed inside the package casing and cooperating with the package casing, and the wound assembly is completely enclosed by the package casing and the bottom sealing structure;
wherein the bottom seat plate has a plurality of first inner surfaces located in the first bottom guide channel, and the first inner surfaces include two first side inner surfaces corresponding to each other and a first top inner surface connected between the two first side inner surfaces;
wherein, a first horizontal distance defined between the first exposed portion of the first conductive pin and one of the first side inner surfaces ranges from 0.01 mm to 0.2 mm, and a first vertical distance defined between the first exposed portion of the first conductive pin and the first top inner surface ranges from 0.01 mm to 0.2 mm;
wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

6. The wound capacitor package structure according to claim 4,
wherein the package assembly includes a package casing configured to accommodate the wound assembly and a bottom sealing structure disposed inside the package casing and cooperating with the package casing, and the wound assembly is completely enclosed by the package casing and the bottom sealing structure;
wherein the bottom seat plate has a plurality of second inner surfaces located in the second bottom guide channel, and the second inner surfaces include two second side inner surfaces corresponding to each other and a second top inner surface connected between the two second side inner surfaces;
wherein, a second horizontal distance defined between the second exposed portion of the second conductive pin and one of the second side inner surfaces ranges from 0.01 mm to 0.2 mm, and a second vertical distance defined between the second exposed portion of the second conductive pin and the second top inner surface ranges from 0.01 mm to 0.2 mm;
wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

7. A movable device configured to use a wound capacitor package structure, the wound capacitor package structure comprising a wound assembly, a conductive assembly, a package assembly and a bottom seat plate;
wherein the conductive assembly includes a first conductive pin electrically contacting the wound assembly and a second conductive pin electrically contacting the wound assembly, the package assembly is configured to enclose the wound assembly, and the bottom seat plate is disposed on a bottom side of the package assembly for carrying the package assembly;

wherein both a first exposed portion of the first conductive pin and a second exposed portion of the second conductive pin pass through the bottom seat plate and are partially exposed from a bottom side of the bottom seat plate;

wherein the bottom seat plate has a first through opening and a first bottom guide channel communicated with the first through opening, and the first exposed portion of the first conductive pin passes through the first through opening and extends along the first bottom guide channel;

wherein the bottom seat plate has a second through opening and a second bottom guide channel communicated with the second through opening, and the second exposed portion of the second conductive pin passes through the second through opening and extends along the second bottom guide channel;

wherein a first gap defined between the first exposed portion of the first conductive pin and an inner surface of the first bottom guide channel of the bottom seat plate ranges from 0.01 mm to 0.2 mm, a bottom side of the first exposed portion of the first conductive pin is exposed from the first bottom guide channel of the bottom seat plate, and a first exposed height defined from the bottom side of the first exposed portion to the bottom side of the bottom seat plate ranges from 0.01 mm to 0.3 mm;

wherein a second gap defined between the second exposed portion of the second conductive pin and an inner surface of the second bottom guide channel of the bottom seat plate ranges from 0.01 mm to 0.2 mm, a bottom side of the second exposed portion of the second conductive pin is exposed from the second bottom guide channel of the bottom seat plate, and a second exposed height defined from the bottom side of the second exposed portion to the bottom side of the bottom seat plate ranges from 0.01 mm to 0.3 mm.

8. The movable device according to claim 7, wherein, when the wound capacitor package structure is electrically connected to a circuit substrate through the first conductive pin and the second conductive pin respectively contacting a first conductive material and a second conductive material, the first exposed portion of the first conductive pin is configured to guide a portion of the first conductive material into the first gap defined between the first exposed portion of the first conductive pin and the inner surface of the first bottom guide channel of the bottom seat plate through capillary action, and the second exposed portion of the second conductive pin is configured to guide a portion of the second conductive material into the second gap defined between the second exposed portion of the second conductive pin and the inner surface of the second bottom guide channel of the bottom seat plate through capillary action;

wherein, before the wound capacitor package structure is electrically connected to the circuit substrate, a ratio of a first thickness of the first conductive material disposed on the circuit substrate to a first exposed height defined from the bottom side of the first exposed portion to the bottom side of the bottom seat plate is 0.1~0.2:0.01~0.3;

wherein, before the wound capacitor package structure is electrically connected to the circuit substrate, a ratio of a second thickness of the second conductive material disposed on the circuit substrate to a second exposed height defined from the bottom side of the second exposed portion to the bottom side of the bottom seat plate is 0.1~0.2:0.01~0.3.

9. The movable device according to claim 7, wherein the package assembly includes a package casing configured to accommodate the wound assembly and a bottom sealing structure disposed inside the package casing and cooperating with the package casing, and the wound assembly is completely enclosed by the package casing and the bottom sealing structure;

wherein the bottom seat plate has a plurality of first inner surfaces located in the first bottom guide channel, and the first inner surfaces include two first side inner surfaces corresponding to each other and a first top inner surface connected between the two first side inner surfaces;

wherein, a first horizontal distance defined between the first exposed portion of the first conductive pin and one of the first side inner surfaces ranges from 0.01 mm to 0.2 mm, and a first vertical distance defined between the first exposed portion of the first conductive pin and the first top inner surface ranges from 0.01 mm to 0.2 mm;

wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

10. The movable device according to claim 7, wherein the package assembly includes a package casing configured to accommodate the wound assembly and a bottom sealing structure disposed inside the package casing and cooperating with the package casing, and the wound assembly is completely enclosed by the package casing and the bottom sealing structure;

wherein the bottom seat plate has a plurality of second inner surfaces located in the second bottom guide channel, and the second inner surfaces include two second side inner surfaces corresponding to each other and a second top inner surface connected between the two second side inner surfaces;

wherein, a second horizontal distance defined between the second exposed portion of the second conductive pin and one of the second side inner surfaces ranges from 0.01 mm to 0.2 mm, and a second vertical distance defined between the second exposed portion of the second conductive pin and the second top inner surface ranges from 0.01 mm to 0.2 mm;

wherein the bottom seat plate has at least two convex support portions disposed on the bottom side thereof and corresponding to each other, the first bottom guide channel and the second bottom guide channel are located between the at least two convex support portions, and a height of each of the convex support portion is equal to the first exposed height or the second exposed height.

* * * * *